3,376,147
FIRE RESISTANT WALLBOARD
Robert M. Dean, Tonawanda, N.Y., assignor to National Gypsum Company, Buffalo, N.Y., a corporation of Delaware
No Drawing. Filed Aug. 20, 1964, Ser. No. 391,003
10 Claims. (Cl. 106—109)

The present invention relates to an improved fire resistant gypsum wallboard.

As is well known in the building industry, fire resistant wallboards are commonly used for the purpose of retarding the passage of fire. Of the various fire resistant boards utilized in the past, one type consisted of the dihydrate of gypsum, $CaSO_4 \cdot 2H_2O$, having unexpanded vermiculite flakes dispersed therein, such as disclosed in Patent No. 2,142,164. The general theory behind this type of board is that the board tends to retard the passage of flame and intense heat because the dihydrate of gypsum, when subjected to intense heat, gives off its water of crystallization, and in so doing keeps the area on the side of the wall away from the flame relatively cool. Essentially the gypsum is calcined during the foregoing process and it tends to shrink. While the gypsum tends to shrink, the dispersed vermiculite flakes expand to compensate for the contraction of the gypsum thereby tending to prevent the board from pulling away from its points of anchorage as a result of such shrinkage. One of the shortcomings of boards containing gypsum and vermiculite flakes was that fissures were produced by the expansion of the vermiculite and such fissures enhanced the passage of flame and heat through the board. It is with an improved fire resistant board which overcomes the foregoing shortcoming that the present invention is concerned.

It is the primary object of the present invention to provide an improved fire resistant gypsum wallboard which has greatly improved fire resistance than previously known types incorporating gypsum and a material such as unexpanded vermiculite for compensating for the shrinkage of the gypsum.

Another object of the present invention is to provide an improved fire resistant gypsum wallboard containing a plurality of additives to the gypsum, said additives functioning under heat to complement the action of each other to thus provide a fire resistant wallboard capable of providing greatly improved fire retarding characteristics.

A further object of the present invention is to provide a highly effective fire resistant wallboard which may be fabricated at a relatively low cost. Other objects and attendant advantages of the present invention will readily be perceived hereafter.

The improved fire resistant gypsum wallboard of the present invention consists essentially of gypsum having dispersed therein both unexpanded vermiculite flakes and unexpanded perlite granules. When this board is subjected to intense heat or a flame, the gypsum will shrink. However, the vermiculite flakes dispersed within the gypsum plaster will expand, in their conventional manner, to thereby tend to compensate for the contraction of the gypsum, and in so doing will create fissures in the gypsum matrix. The vermiculite, in expanding in response to being heated, acts in the nature of a starter, by causing fissures, to permit the heat to be directed at the unexpanded perlite which is also dispersed in the gypsum matrix. It is believed that the perlite by being exposed to heat through the fissures created by the expansion of said vermiculite, in turn expands to tend to fill these fisures, and by thus expanding, the perlite tends to blocks the fissures and in this sense cooperates in the fire retarding action by preventing the flame and heat from passing through the board.

The vermiculite and perlite acting in concert thus essentially provide a two-stage action which causes each of them to complement the action of the other. In this respect the vermiculite will expand as a result of initially being subjected to the heat, and in turn will compensate for the shrinkage of the gypsum plaster, but in so doing will create the above described fissures. Once the fissures have been produced in the wallboard by the expansion of the vermiculite, the perlite will be caused to come into action. The fissures not only remove the restraint on the perlite which was previously provided by the gypsum matrix, but also permit the heat to be directed at the unexpanded perlite adjacent the heated fissures to thereby cause the perlite which has a higher expansion temperature than the vermiculite, to expand. As a result of being exposed to greater heat after said fissures have been opened, the expanded perlite tends to fill said said fissures in the above described manner and produce the above described result of tending to block the passage of flame and intense heat through the board.

It has been found that the use of perlite without the accompaniment of the vernmiculite, which provides the initial fissuring in the board, does not provide the improved fire retarding characteristics because without such initial rupture, the perlite in the body of the matrix will not expand because of not being properly exposed to the heat, and its expansion will be confined only to an area along the surface exposed to heat and not homogeneously throughout the gypsum matrix.

Commercial compositions of the improved fire resistant gypsum wallboard made in accordance with the present invention are as follows:

COMPOSITION

| Material | Pounds per 1,000 Sq. Ft. | |
|---|---|---|
| | ½" Board | ⅝" Board |
| Paper Pulp | 4.5 (.24%) | 5.0 (.21%). |
| Glass Fiber | 8.5–9.0 (.45–.47%) | 11.5–12 (.49–.51%). |
| Perlite Ore | 56–58 (2.9–3.0%) | 70–72 (3.0–3.1%). |
| Vermiculite Ore | 40–42 (2.1–2.2%) | 50–52 (2.1–2.2%). |
| Paper Covering | 140 | 190. |
| Core Starch | 10.8–13.5 (.57–.71%) | 13.6–17.0 (.58–.72%). |
| Stucco, by difference to make. | 2,050 (93.2%) | 2,550 (94%). |

Approximately 77–87 pounds of water are mixed with the above ingredients per hundred pounds of stucco, depending on the amount required to obtain proper fluidity of the mix.

The foregoing percentages are based on the total weight of the core exclusive of the paper covering. Where ranges of ingredients are given in the above table, such ranges merely set forth manufacturing tolerances which are observed in a continuous formulating process and these ranges are not intended to reflect critical ranges of materials.

The paper pulp is used to provide weight and water control. In this respect the paper pulp soaks up water and when the water is driven off during drying causes minute air spaces to remain in the board, thereby controlling its weight. Furthermore, the paper pulp increases the flexibility of the board. The glass fibers provide bonding strength for increasing the strength of the board by providing a fibrous network across the fissures produced in the gypsum during exposure to fire. The functions of the perlite and vermiculite ores were described in detail above. The core starch tends to migrate to the outer surfaces during the drying of the board and acts to delay the drying process in the sense that it causes the gypsum to retain its water of hydration when it is heated during the drying process. The function of the stucco or gypsum was described above.

The gypsum wallboard described above is fabricated in the conventional manner well known in the art. In this respect, after all the ingredients are mixed with water and a slurry is formed, it is deposited between sheets of paper, formed, allowed to set, and dried at suitable temperatures, as is well known in the art.

In the above composition the perlite ore which was used was of plaster grade and had 2.5% maximum free moisture and under test would lose 2.0%–6.9% moisture on ignition. Furthermore it had a maximum $CO_2$ content of .25%. The expanded volume of the perlite ore was in the neighborhood of 4 cc. minimum as determined by an expansion test wherein 3 cc. was placed in a crucible and then heated for five minutes in an oven preheated to 1500° F., said 4 cc. being the minimum resulting volume after cooling. The perlite used satisfactorily in the above composition was both from deposits at Agua, N. Mex. and Florence, Colo. Furthermore, the following percents by weights passed through the following U.S. sieves, it being appreciated, of course, that variations can be made within the scope of the present invention and that the following is given merely by way of example and not of limitation.

| U.S. Sieve | Retained Percent by Weight | |
|---|---|---|
| | Min. | Max. |
| On 16 Mesh | 0 | 0 |
| Thru 16 on 20 Mesh | 2 | 6 |
| Thru 20 on 30 Mesh | 7 | 15 |
| Thru 30 on 50 Mesh | 40 | 50 |
| Thru 50 on 100 Mesh | 25 | 35 |
| Thru 100 Mesh | 5 | 10 |

The vermiculite ore which was used in the above composition is commonly designated as No. 3 grade and has a bulk density of between 56 and 60 lbs. per cubic foot. Furthermore, the expanded volume on heating was not less than 10.4 cc. as determined by an expansion test wherein 3 cc. was placed in a crucible and then heated for five minutes in an oven which was preheated to 1500° F., said 10.4 cc. being the minimum resulting volume after cooling. The sieve analysis of the vermiculite used in the above composition was as follows:

| U.S. Standard Sieve Size | Retained Percent by Weight | |
|---|---|---|
| | Min. | Max. |
| No. 8 | 0 | 8 |
| No. 16 | 10 | 30 |
| No. 20 | 19 | 38 |
| No. 30 | 19 | 38 |
| No. 50 | 9 | 27 |
| No. 100 | 0 | 12 |

It will be appreciated that there can be departures from the foregoing within the scope of the present invention and that the foregoing is presented merely by way of example and not by way of limitation. The foregoing vermiculite was obtained from the deposit in Libby, Mont. mined by the Zonolite Corporation.

The glass fiber which was used was .00048 inch plus or minus .00015 inch in diameter, and where 60 strand rovings were used they did not weigh less than .63 gram per foot and not more than .77 gram per foot. Furthermore, there were approximately 204 filaments to the strand. The rovings were cut to approximately ½" lengths. The binder for the rovings was starch to permit the individual filaments to readily disperse in a gypsum slurry. A commercial product which was used in the above composition is made by Owens-Corning Fiberglas Corporation and is identified by No. 710.

The core starch is a standard wallboard starch which is a thin boiling acidified corn starch having the following sieve size:

| Passes through U.S. sieve No.— | Percent |
|---|---|
| 4 | 100 |
| 30 | minimum 96 |
| 60 | do 80 |
| 80 | do 65 |

A suitable core starch is known by the trademark Hi-Bond manufactured by the Lauhoff Grain Company.

The gypsum or stucco which is the raw material for the wallboard is preferably board plant stucco, namely, $CaSO_4 \cdot \frac{1}{2}H_2O$, having a size of between 4000 and 5000 square centimeters per gram as measured by the air permeability method of testing. Board plant stucco made from gypsum mined at Halifax, Nova Scotia, Tawas, Mich., and Fort Dodge, Iowa, has been used satisfactorily in the above described composition.

As is well known in the art accelerators such as potassium sulphate, ammonium sulphate, terra alba, or land plaster fines may be added in suitable quantities to the mixture to control the setting time of the above mixture.

The paper coating is paper sheeting used on the outer surfaces of the composition after it has been poured in the conventional manner. A paper sheet forms the outside wall on each side of the wallboard.

It is to be again noted that the above discussed physical characteristics of the listed components of the fire resistant wallboard are intended merely by way of illustration and not of limitation considering the fact that components having physical characteristics which vary from those enumerated above can be used within the basic scope of the present invention.

The present fire resistant wallboard provides greatly improved characteristics with respect to sagging, dropout, temperature rise, and shrinkage when exposed to fire. In Underwriters' Laboratories tests in accordance with procedure U.L. 263 (ASTM E119 and NFPA No. 251) the following results were obtained with fire resistant wallboards having the above formulation. A ⅝" board has passed a fire endurance rating designated by Underwriters' Laboratories as Design No. 60—3 hours. A ½" board has passed a fire endurance rating designated by Underwriters' Laboratories as Design No. 69—2 hours and Design No. 214—2 hours, Beam—3 hours and also Design No. 34—1 hour. As noted above, ratings of the foregoing type were heretofore unobtainable with boards incorporating essentially only stucco and vermiculite.

In order to evaluate the fire resistant characteristics of fire resistant boards containing different percentages of perlite and vermiculite, a shrinkage test was made on such boards. Where the shrinkage data which was obtained was within acceptable limits it was considered that such boards had improved fire resistant characteristics inasmuch as the shrinkage was confined to a value which would permit the perlite to expand sufficient to block the passage of flame and heat through fissures which were produced by the combined expansion of the vermiculite and contraction of the gypsum.

The following shrinkage test data was obtained from the testing of various samples having different percentages of vermiculite and perlite of the sizes noted above. All samples contained approximately .5% by weight of glass fibers and also contained the other same basic components noted above in the commercial compositions. The tests were made on ⅝" wallboard. The samples which were used were 11⅞" x 11⅞", which were cut in half to give two pieces which were placed side-by-side when subjected to a gas flame of 1800° F. for thirty minutes. The resulting expansion or contraction was measured along the 11⅞" dimension. All of the following tests were within an acceptable range of about ⅛ of an inch expansion and of about 3/16 inch contraction. In the following table, values preceded by a plus sign denote expansion and by a minus sign denote contraction:

| Test No. | Percent Vermiculite and Perlite | | Change in Dimension in Inches, ⅝″ Board |
|---|---|---|---|
| | Vermiculite | Perlite | |
| 1 | 2 | 3 | +1/64 |
| 2 | 2 | 3 | 0 |
| 3 | 1.85 | 4 | +1/64 |
| 4 | 1.5 | 7.5 | −1/128 |
| 5 | 2 | 4 | −1/128 |
| 6 | 1.57 | 4 | −1/64 |
| 7 | 1.71 | 4 | −1/64 |
| 8 | 1.5 | 5 | −3/128 |
| 9 | 1.5 | 6.5 | −1/32 |
| 10 | 1 | 1 | −5/64 |
| 11 | 3 | 1 | −2/64 |
| 12 | 1 | 2 | −3/64 |
| 13 | 3 | 3 | −2/64 |
| 14 | 6 | 3 | +6/64 |
| 15 | 3 | 6 | 0 |
| 16 | 3 | 10 | −3/64 |
| 17 | 6 | 6 | +9/64 |
| 18 | 6 | 1 | +10/64 |
| 19 | 6 | 10 | +11/64 |

It can be seen that the improved fire resistant board made in accordance with the principles of the present invention is manifestly capable of providing improved fire retarding qualities.

What is claimed is:

1. A fire resistant wallboard consisting essentially of gypsum, unexpanded vermiculate and unexpanded perlite both uniformly dispersed in said gypsum, said unexpanded vermiculite being present in an amount and of a particle size sufficient to compensate by expansion on exposure to heat for the shrinkage of said gypsum when said gypsum is dehydrated by exposure to heat, said expansion of vermiculite and shrinkage of gypsum producing fissures within the wallboard and said perlite being present in an amount and of a particle size sufficient to substantially fill said fissures by secondary expansion of perlite upon exposure to heat through said fissures, said shrinkage of said gypsum and said compensation provided by said vermiculite and perlite on expansion being within about ⅛″ expansion and 3/16″ contraction per linear foot.

2. A fire resistant wallboard of claim 1 further consisting essentially of fibers dispersed in said gypsum.

3. A fire resistant wallboard of claim 2 wherein said fibers are glass fibers.

4. A fire resistant wallboard of claim 1 wherein said unexpanded vermiculite is present in an amount of about 2% by weight of the total weight of the wallboard and wherein said unexpanded perlite is present in an amount of about 3% by weight of the total weight of the wallboard.

5. A fire resistant wallboard of claim 4 further consisting essentially of glass fibers dispersed in said gypsum.

6. A fire resistant wallboard of claim 4 wherein the perlite particles have the following particle size distribution: retained on 16 mesh, 0%; thru 16 mesh and retained on 20 mesh, 2 to 6%; thru 20 mesh and retained on 30 mesh, 7 to 15%; thru 30 mesh and retained on 50 mesh, 40 to 50%; thru 50 mesh and retained on 100 mesh, 25 to 35%; thru 100 mesh, 5 to 10%; and wherein the vermiculite particles have the following retained weight percent sieve analyses; 8 mesh, 0 to 8%; 16 mesh, 10 to 30%; 20 mesh, 19 to 38%; 30 mesh, 19 to 38%; 50 mesh, 9 to 27%; and a 100 mesh, 0 to 12%.

7. A fire resistant wallboard as set forth in claim 6 further consisting essentially of glass fibers dispersed in said gypsum.

8. A fire resistant wallboard of claim 1 wherein said unexpanded vermiculite is present in an amount of between about 1 and 6% by weight of the total weight of the wallboard and wherein said unexpanded perlite is present in an amount of between about 1 to 10% by weight of the total weight of the wallboard.

9. A fire resistant wallboard of claim 8 wherein the perlite particles have the following particle size distribution: retained on 16 mesh, 0%; thru 16 mesh and retained on 20 mesh, 2 to 6%; thru 20 mesh and retained on 30 mesh, 7 to 15%; thru 30 mesh and retained on 50 mesh, 40 to 50%; thru 50 mesh and retained on 100 mesh, 25 to 35%; thru 100 mesh 5 to 10%; and wherein the vermiculate particles have the following retained weight percent sieve analyses: 8 mesh, 0 to 8%; 16 mesh, 10 to 30%; 20 mesh, 19 to 38%; 30 mesh, 19 to 38%; 50 mesh, 9 to 27%; and a 100 mesh, 0 to 12%.

10. A fire resistant wallboard of claim 9 further consisting essentially of glass fibers dispersed in said gypsum.

References Cited

UNITED STATES PATENTS

| | | | |
|---|---|---|---|
| 2,142,164 | 1/1939 | Young et al. | 52—336 |
| 2,525,066 | 10/1950 | Croce | 106—110 |
| 2,705,197 | 3/1955 | Seybold | 252—378 |
| 2,744,022 | 5/1956 | Croce et al. | 161—162 |
| 2,853,394 | 9/1958 | Riddell et al. | 106—115 |
| 2,945,820 | 7/1960 | Ziegler | 252—378 |
| 3,010,911 | 11/1961 | Robinson | 252—378 |

TOBIAS E. LEVOW, *Primary Examiner.*

S. E. MOTT, *Assistant Examiner.*